United States Patent Office 2,928,855
Patented Mar. 15, 1960

2,928,855

MERCURIAL DIURETICS

Harry Louis Yale, New Brunswick, N.J., assignor to Olin Mathieson Chemical Corporation, New York, N.Y., a corporation of Virginia No Drawing. Application August 4, 1954
Serial No. 447,928

8 Claims. (Cl. 260—431)

This invention relates to new organic compounds and more particularly to new mercurated derivatives, useful as diuretics.

The compounds of this invention may be represented by the following structural formula:

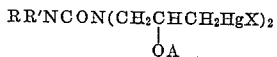

wherein each of R and R' is a member of the class consisting of hydrogen, alkyl, aralkyl, and aryl, and together with the nitrogen atom represent an N-heterocyclic radical; A is a member of the class consisting of hydrogen, alkyl, and aralkyl; and X is an anionic radical. Among the members defined by R and R' are hydrogen; alkyl (particularly lower alkyl, such as methyl, ethyl, propyl, butyl, etc.); aralkyl (particularly aralkyl hydrocarbon, such as benzyl, phenethyl, etc.); and aryl (particularly aryl hydrocarbon, such as phenyl, naphthyl, tolyl, xylyl, etc.). Among the members defined by RR'N are piperidino, piperazino, morpholino, and pyrrolidino, as well as their lower alkyl substituted derivatives. Among the members defined by A are hydrogen; alkyl (particularly lower alkyl, such as methyl, ethyl, propyl, butyl, etc.); and aralkyl (particularly aralkyl hydrocarbon, such as benzyl, phenethyl, etc.). X, in the above formula, is a monovalent anionic radical and includes inorganic anions (e.g. hydroxyl, halide, sulfate, and nitrate) and organic anions such as acyloxy radicals (e.g. alkanoyloxy radicals, such as the acetate, propionate and butyrate radicals; aroyloxy radicals, such as benzoate and naphthoate; and aralkanoyloxy radicals, such as phenylacetate and phenylpropionate).

A particularly preferred class of compounds are those of the formula given hereinbefore wherein each of R and R' is hydrogen and A is a lower alkyl radical.

The invention also includes certain novel compounds, diallyl ureas, useful as intermediates for the production of the diuretic compounds of this invention.

Various methods are available for preparing the intermediate dialkyl ureas of this invention. These intermediates may be prepared by the reaction of a carbamyl halide of the formula RR'NCOX' (wherein X' is a halogen, preferably chloride) with diallylamine, by refluxing the reactants in an inert solvent such as benzene or pyridine. They may also be prepared by the reaction of a urethane of the formula RR'NCOOR" (wherein R"O is the oxy radical of an alcohol R"OH, and preferably is a lower alkoxy radical such as methoxy or ethoxy) with diallylamine by heating the two in a sealed vessel under autogenous pressure to about 100° C. Still another method involves the reaction of a urea of the formula RR'NCONH$_2$ with diallylamine at a temperature in the range of 100° C. to 200° C. Intermediate diallylureas of the formula R'''NHCON(CH$_2$CH=CH$_2$)$_2$ may be prepared by the reaction of a nitrourea of the formula R'''NHCONHNO$_2$ (wherein R''' is hydrogen, a lower alkyl radical of two or more carbon atoms, or an aralkyl radical) with one or more moles of diallylamine, by heating these two reactants together at a temperature in the range of 50° C. to 150° C. (most advantageously to about 100° C.) under autogenous pressure in a sealed vessel. Unsubstituted diallyl urea of the formula NH$_2$CON(CH$_2$CH=CH$_2$)$_2$ may be prepared by reacting an alkali metal isocyanate, such as potassium isocyanate with diallylamine hydrochloride, by heating in an aqueous medium at 100° C. in a sealed tube.

Suitable nitroureas of the formula RR'NCONHNO$_2$ which may be employed in the practice of this invention include: nitrourea; alkyl nitroureas, such as lower alkyl-substituted nitroureas (e.g. 3-methyl-1-nitrourea, 3-ethyl-1-nitrourea, 3-n-propyl-1-nitrourea, 3-n-butyl-1-nitrourea and 3-n-amyl-1-nitrourea); dialkyl nitroureas, such as di(lower alkyl)-substituted nitroureas (e.g. 3,3-dimethyl-1-nitrourea, 3,3-diethyl-1-nitrourea, and 3,3-dipropyl-1-nitrourea); aralkyl nitroureas, such as aralkyl hydrocarbon nitroureas (e.g. 3-benzyl-1-nitrourea, 3-benzyl-3-methyl-1-nitrourea, and 3-phenethyl-1-nitrourea); aryl nitroureas, such as aryl hydrocarbon nitroureas (e.g. 3-phenyl-1-nitrourea); and N-heterocyclic carbonylnitramines, such as piperidinoyl nitramine, piperazinoyl nitramine, morpholinoyl nitramine, and pyrrolidinoyl nitramine.

The diallylurea intermediate of the formula

is then heated (preferably to reflux) with (a) a mercuric salt, HgB$_2$, wherein B$_2$ represents two equivalents of an anion, such as an inorganic anion and (preferably) an organic anion, for example, an alkanoyloxy (e.g. acetate and propionate); and with (b) water or an alcohol of the formula AOH, preferably in the presence of an acid such as glacial acetic acid. Suitable alcohols of the formula AOH which may be used in the practice of this invention include alkanols, such as lower alkanols (e.g. methanol, ethanol, propanol, and n-butanol), and aralkanols, such as aralkanol hydrocarbons (e.g. benzyl alcohol and phenyl ethanol). The mercuric derivative thus formed, has the formula

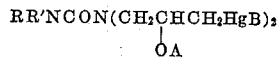

it may be converted to the salt of a different anion, X, either in situ or in a separate additional step by metathesis with a salt, MeX wherein Me is a metal such as an alkali metal (e.g. sodium and potassium) and X is as above defined, to form the final product

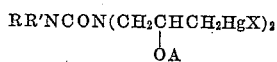

The following examples illustrate suitable methods for practicing this invention and are in no way to be considered as limitative:

EXAMPLE 1

*1,1-di-(3-chloromercuri-2-methoxypropyl)urea*

(a) *Diallylurea.*—A mixture of 7.5 (0.071 mole) of nitrourea, 11 ml. of diallylamine and 50 ml. of water is heated 4 hours at 100° C. in a sealed tube. The cooled tube is opened and the reaction mixture concentrated in vacuo on a steam bath. The residue solidifies on cooling and drying in a desiccator. Recrystallization from Skellysolve E (a petroleum solvent) gives about 10 g. (100% yield) of the product, M.P. about 60–62° C.

(b) *1,1-di-(3-acetoxymercuri-2-methoxypropyl)urea.*—To 22 g. (0.069 mole) of mercuric acetate in 300 ml. of methanol and 5 ml. of glacial acetic acid, at reflux, is added dropwise with stirring, a solution of 4.82 g. (0.0345 mole) of diallylurea in 300 ml. of methanol. Subsequently the mixture is refluxed for 24 hours. The mixture is concentrated at room temperature and the residual oil is dried in vacuo over $P_2O_5$ to give a friable solid consisting of 1,1-di-(3-acetoxymercuri-2-methoxypropyl)-urea.

(c) *1,1-di-(3-chloromercuri-2-methoxypropyl)urea.*—The 1,1-di-(3-acetoxymercuri-2-methoxypropyl)urea is dissolved in 100 ml. of water and decolorized with Darco (activated carbon) and filtered. The filtrate is then treated, dropwise, with a total of 12 ml. of a 20% aqueous solution of sodium chloride. A white crystalline solid separates directly and is filtered and dried. Repeated extractions with methyl ethyl ketone gives about 14 grams (about 60% yield) of a colorless solid which sinters at about 80° C. and melts at about 130° C. This solid is 1,1-di-(chloromercuri-2-methoxypropyl)urea having the structural formula:

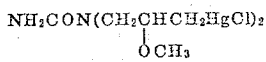

If 1,1-di-(3-chloromercuri-2-methoxypropyl)urea is heated with water, the salt is hydrolyzed to the basic 1,1-di-(3-hydroxymercuri-2-methoxypropyl)urea.

EXAMPLE 2

(a) *Diallylurea* is prepared according to the procedure in Example 1a.

(b) *1,1 - di-(3-acetoxymercuri-2-ethoxypropyl)urea.*—To 31.9 g. of mercuric acetate in 400 ml. of absolute ethanol and 10 ml. of glacial acetic acid, at the boiling point and with stirring, is added 7.1 g. of diallylurea in 300 ml. of absolute ethanol. The mixture is refluxed for 24 hours, after which the solvents are evaporated at room temperature to give a residue of 1,1-di-(3-acetoxymercuri-2-ethoxypropyl)urea.

(c) *1,1 - di - (3-chloromercuri-2-ethoxypropyl)urea.*—The 1,1-di-(3-acetoxymercuri-2-ethoxypropyl)urea is dissolved in 100 ml. of warm methanol and the solution treated dropwise with a solution of 5.9 g. of sodium chloride in 60 ml. of water. The product which separates directly from the mixture is filtered and recrystallized from aqueous ethanol to give 1,1-di-(3-chloromercuri-2-ethoxypropyl)urea having the formula:

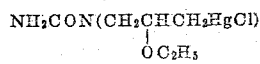

In a similar manner, following the procedure of Examples 1 and 2 but substituting equivalent amounts of other alcohols such as isopropanol, butanol and benzyl alcohol for the methanol and ethanol in Example 1b and 2b, respectively, the corresponding 2-isopropoxy, 2-butoxy, and 2-benzyloxy derivatives are produced.

EXAMPLE 3

*1,1-di-(3-chloromercuri-2-methoxypropyl)-3-ethylurea*

(a) *1,1-diallyl-3-ethylurea.*—A mixture of 13.3 g. of 1-nitro-3-ethylurea, 10.7 g. of diallylamine and 50 ml. of water are heated in a sealed vessel at 100° C. for five hours. The cooled vessel is opened and the solution concentrated in vacuo to give 1,1-diallyl-3-ethylurea as a crystalline solid.

(b) *1,1-di-(3 - acetoxymercuri - 2 - methoxypropyl)-3-ethylurea.*—To 31.0 g. of mercuric acetate in 400 ml. of methanol and 5 ml. of glacial acetic acid, at the boiling point, is added dropwise a solution of 8.4 g. of 1,1-diallyl-3-ethylurea in 50 ml. of methanol. Subsequently, the mixture is refluxed for eighteen hours and the solvents removed at room temperature. The residual oil consists of 1,1-di-(3-acetoxymercuri-2 - methoxypropyl)-3 - ethylurea.

(c) *1,1-di-(3-chloromercuri-2-methoxypropyl)-3-ethylurea.*—The oil obtained in step b is dissolved in 50 ml. of warm methanol, and to the methanol solution, with stirring, is added dropwise a solution of 5.9 g. of sodium chloride in 60 ml. of water. The product, 1,1-di(3-chloromercuri-2 - methoxypropyl)-3 - ethylurea separates directly and is purified by recrystallization from aqueous methanol. It has the structural formula:

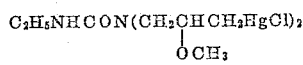

In a similar manner by substituting other nitroureas for the nitrourea of Examples 1 and 2 or for the 1-nitro-3-ethylurea of Example 3, the corresponding derivatives are formed. When 1-nitro-3-propylurea is used in step a of the examples the corresponding 1,1-di-(3-chloromercuri-2-methoxypropyl)-3-propylurea and 1,1-di-(3-chloromercuri-2-ethoxypropyl)-3-propylurea are formed. When 1-nitro-3-n-butylurea is substituted in step a of the examples the corresponding 1,1-di-[3-chloromercuri-2-methoxy (or ethoxy)propyl]-3-n-butylurea is formed. Similarly 1-nitro-3-n-amylurea yields 1,1-di[3-chloromercuri-2-methoxy(or ethoxy)propyl]-3-n-amylurea.

EXAMPLE 4

(a) *1,1-diallylurea* is prepared in accordance with the procedure in Example 1a.

(b) *1,1-di-(3 - hydroxymercuri-2 - hydroxypropyl)urea.*—To 31.9 g. of mercuric acetate in 300 ml. of water and 10 ml. of glacial acetic acid, at the boiling point and with stirring, is added 7.1 g. of diallylurea in 350 ml. of water. The mixture is refluxed for 20 hours and cooled to give an about 50% yield of 1,1-di-(3-hydroxymercuri-2-hydroxypropyl)urea, having the structural formula

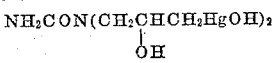

1,1-di-(3 - hydroxymercuri-2-hydroxypropyl)urea may be combined with compounds such as theophylline to give the corresponding theophylline salt, thus combining the diuretic properties of the mercurial moiety and theophylline.

This invention may be variously otherwise embodied within the scope of the appended claims.

I claim:

1. A compound having the structural formula:

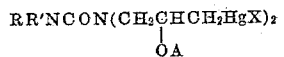

wherein each of R and R′ is a member of the class consisting of hydrogen and lower alkyl; A is a member of the class consisting of hydrogen, lower alkyl and phenyl lower alkyl hydrocarbon; and X is a pharmaceutically-acceptable anionic radical.

2. A compound having the structural formula:

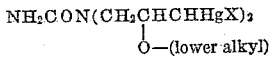

wherein X is a pharmaceutically-acceptable anionic radical.

3. 1,1-di-(3-chloromercuri-2-methoxypropyl)urea.
4. 1,1-di-(3-acetoxymercuri-2-methoxypropyl)urea.
5. 1,1-di-(3-chloromercuri-2-ethoxypropyl)urea.
6. A compound having the structural formula:

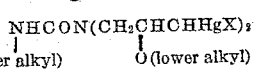

wherein X is a pharmaceutically-acceptable anionic radical.

7. 1,1-di-(3-chloromercuri - 2-methoxypropyl)-3-ethylurea.

8. 1,1-di-(3-hydroxymercuri-2-hydroxypropyl)urea.

References Cited in the file of this patent

UNITED STATES PATENTS

| | | |
|---|---|---|
| 2,273,891 | Pollack et al. | Feb. 24, 1942 |
| 2,576,349 | Lehman | Nov. 27, 1951 |
| 2,592,418 | Halpern | Apr. 8, 1952 |
| 2,635,982 | Rowland | Apr. 21, 1953 |
| 2,635,983 | Foreman | Apr. 21, 1953 |
| 2,636,045 | Halpern | Apr. 21, 1953 |
| 2,655,534 | Searle | Oct. 13, 1953 |
| 2,672,472 | Yale | Mar. 16, 1954 |
| 2,673,877 | Thompson | Mar. 30, 1954 |
| 2,675,388 | Lehman | Apr. 13, 1954 |

FOREIGN PATENTS

| | | |
|---|---|---|
| 447,405 | Great Britain | May 11, 1939 |

OTHER REFERENCES

Rowland et al.: JACS, vol. 72, pp. 3595–98, August 1950.

Rowland et al.: JACS, vol. 73, pp. 3691–93, August 1951.

Rowland: JACS, vol. 74, pp. 5482–84 (received June 23, 1952).

Journ. Org. Chem., vol. 15, pp. 1055–1059 (1950).